(12) United States Patent
Vine

(10) Patent No.: US 6,824,916 B2
(45) Date of Patent: Nov. 30, 2004

(54) HYBRID BATTERY HOUSING

(75) Inventor: Douglas A. Vine, Suwanee, GA (US)

(73) Assignee: Motorola, Inc., Schaumburg, IL (US)

(*) Notice: Subject to any disclaimer, the term of this patent is extended or adjusted under 35 U.S.C. 154(b) by 175 days.

(21) Appl. No.: 10/147,738

(22) Filed: May 16, 2002

(65) Prior Publication Data
US 2003/0215708 A1 Nov. 20, 2003

(51) Int. Cl.[7] .............................. H01M 2/10; H01M 2/02
(52) U.S. Cl. .......................... 429/96; 429/100; 429/176; 428/119; 428/220
(58) Field of Search .............................. 429/96, 97, 98, 429/99, 100, 176; 29/623.1, 623.2, 623.4; 264/176.1, 259, 268, 271.1, 275; 428/119, 213, 220

(56) References Cited

U.S. PATENT DOCUMENTS

| | | | | |
|---|---|---|---|---|
| 5,132,071 A | * | 7/1992 | Sorensen | 264/259 |
| 5,248,364 A | * | 9/1993 | Liu et al. | 264/176.1 X |
| 5,897,823 A | * | 4/1999 | Davis et al. | 264/268 X |
| 5,911,334 A | | 6/1999 | Helms | |
| 6,053,353 A | | 4/2000 | Helms | |
| 6,258,312 B1 | * | 7/2001 | Heyn | 264/275 X |
| 6,372,382 B2 | * | 4/2002 | Peterson | 429/176 X |
| 6,376,122 B1 | * | 4/2002 | Cheeseman | 429/99 |
| 6,376,126 B1 | * | 4/2002 | Faust et al. | 429/176 |
| 6,682,686 B1 | * | 1/2004 | Iwasaki et al. | 264/268 X |
| 2003/0207171 A1 | * | 11/2003 | Law et al. | 429/176 |

* cited by examiner

Primary Examiner—Stephen J. Kalafut
(74) Attorney, Agent, or Firm—Philip H. Burrus, IV

(57) ABSTRACT

This invention includes a hybrid housing for rechargeable battery packs. The housing utilizes a thin, plastic film bottom with insert-molded plastic walls. The bottom member is up to 50% thinner than prior art bottom members made by way of an injection molding process. The resultant battery housing is thinner and stronger than prior art housings.

6 Claims, 2 Drawing Sheets

100
-PRIOR ART-

-PRIOR ART-

HYBRID BATTERY HOUSING

BACKGROUND

1. Technical Field

This invention relates generally to housings for rechargeable batteries, and more particularly to very thin housings utilizing insert molding to reduce the wall thickness.

2. Background Art

Portable, battery-operated, electronic devices seem to be everywhere. From handheld games, to compact disc players, to radios, to personal data assistants (PDAs), to phones, to pagers, it is becoming rare to encounter a person who does not carry at least one portable electronic device with them all the time. People carry the devices for entertainment, for organizational purposes, and for staying connected with others. A common characteristic shared by each of these devices is that they all rely on batteries for portability.

The general trend with such electronic devices is that manufacturers are making them smaller and smaller. Consequently, the batteries must be smaller as well. While some may think that a rechargeable battery is simply an electrochemical cell, commercial rechargeable batteries are actually sophisticated devices that include advanced electronic circuits. For example, a typical rechargeable battery will include a rechargeable cell, electrical contacts, a circuit board, a safety circuit, an optional charging circuit, and occasionally a fuel gauging circuit. All of these components are placed into a housing. As electronic devices get smaller, manufacturers are demanding that the batteries get smaller too.

The most common way to manufacture housings for rechargeable battery packs is injection molding. In the injection molding process, molten plastic is injected into the cavity of a metal mold. The plastic flows throughout the cavity, thereby filling it. When the plastic cools, the mold is opened and the plastic part is removed.

One problem with injection molding is that there is a fundamental limit to the minimum thickness per unit area of walls of any part. This is due to the flow of the molten plastic. If the cavity in the mold includes passages that are too thin, the plastic will not flow properly through these thin regions. Improper plastic flow leads to parts with walls that break easily or have holes in them. The net result is a battery housing with walls that fall apart too easily. The fundamental limit of battery housing wall thickness means that electronic device manufacturers' designs are limited by battery size. It would be desirable to make a thinner battery pack, thereby allowing electronic device manufacturers to further reduce the size of their devices.

There is thus a need for a battery housing having thinner walls.

DETAILED DESCRIPTION OF THE INVENTION

Figure 1:
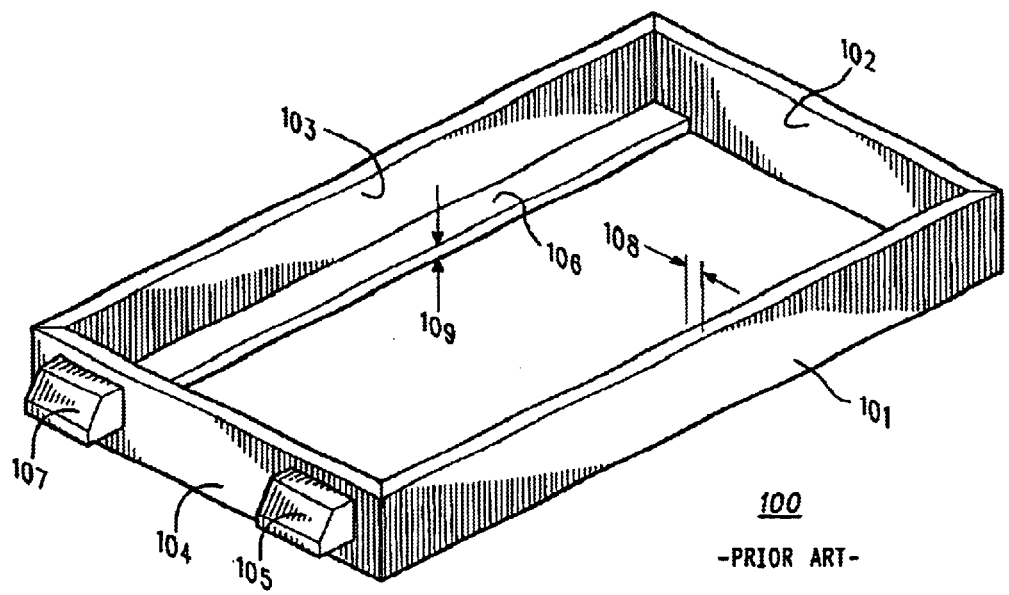
FIG. 1 is a prior art battery housing made from an injection molding process.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now to FIG. 1, illustrated therein is a prior art battery housing 100 manufactured by way of an injection molding process. This particular housing 100 would be suited for a single-cell, lithium-ion type battery, as they are generally rectangular in shape. It is understood by those of ordinary skill in the art that injection molding allows the designer to create housings in nearly any form factor.

This particular housing 100 includes four walls 101–104 and a bottom ledge 106. The bottom ledge 106 offers a thinner final design than would a full bottom member extending from wall 101 to 103, and from 102 to 104. The drawback to adding a full bottom is that the ultimate thickness must be increased in that the plastic must flow farther in the mold.

The housing 100 includes latch members 105,107 that facilitate mechanical coupling of the battery housing 100 to the electronic device. While to latches 105,107 are shown in this exemplary embodiment, any number and configuration of latches could be added, including latches on wall 102.

Experimental testing has shown that the fundamental minimum wall thickness, expressed by measurement 108, that can be obtained by injection molding for a standard lithium-ion cell is 0.25 mm. In addition to the fundamental minimum thickness represented by measurement 108, structural stability for the thickness of the bottom ledge 106, represented by measurement 109, requires at least 0.5 mm thickness. Consequently, the best-case (i.e. minimum size) battery pack for single-cell, lithium-ion applications is 33.1× 50×5.15 mm.

As there is only a bottom ledge 106 and no full bottom member, structural rigidity is often provided by wrapping an adhesive label about the housing 100 after a battery cell and the associated circuitry has been placed therein. This practice, however, leads to problems in manufacture, as illustrated below.

Figure 2:
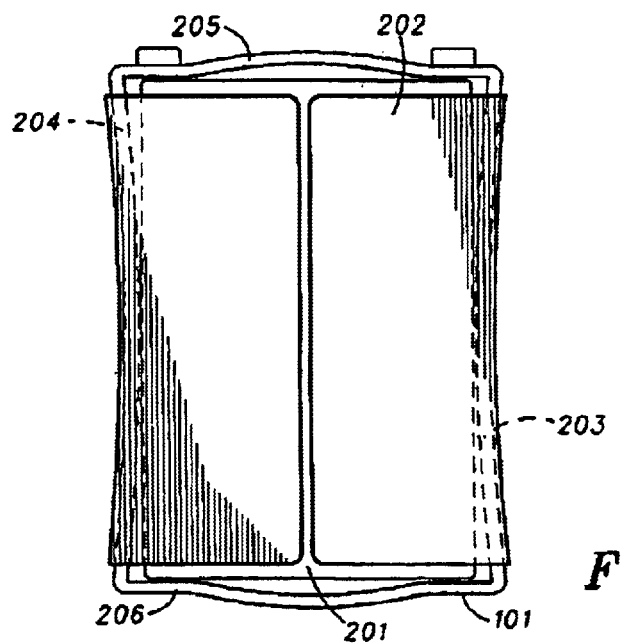
FIG. 2 is a prior art battery housing having a label wrapped thereabout.

Referring now to FIG. 2, illustrated therein is the problem associated with wrapping labels about housings where no bottom member is included. FIG. 2 has been drawn to exaggerated proportions to illustrate the issue at hand. In FIG. 2, there is a battery cell 201 with a prior art housing 101 having no bottom member. An adhesive label 202 has been wrapped about the housing 101 for structural support. As wall thickness tolerances must be added to the housing 101, there is some free space, or "play", between the cell 201 and the housing 101. The play is required to ensure that all brands of cells will fit within the housing 101. However, due to the play, when the label 202 is wrapped about the cell, the sides 203, 204 bow in from the resulting label tension. This bowing can compromise the mechanical integrity of fit between the battery pack 200 and the intended electronic device.

The simple solution to the bowing is to add a bottom member. However, this causes a problem because the minimum thickness of the bottom member is about 0.25 mm. Thus, the battery pack that measured 34.2×50×5.15 mm grows to 34.2×50×5.4 mm. While this sounds like a minimal amount, to a PDA designer who is trying to get as thin as possible, it is quite important.

The present invention allows the thickness of a bottom member to be reduced by 50% over injection molding. The invention also provides structural stability to the walls, thereby providing a thinner, stronger battery housing. The invention employs insert molding to construct a battery housing having a plastic film bottom, and plastic end and sidewalls. The result is a battery pack that occupies less space by volume, as well a pack that impedes bowing of the walls. The invention allows electronics manufacturers to make smaller products with stronger internal battery packs.

Insert molding is well known in the art. Essentially, in an insert molding process, a solid member is inserted into a mold cavity prior to the injection of molten plastic. When the molten plastic is injected, the plastic flows about the solid piece, thereby adhering to it. When the solid piece is also plastic, the solid piece melds with the molten plastic. The resultant part is a plastic part having a solid member embedded therein. By way of example, U.S. Pat. No. 4,249,874, issued to Reichenbach et al., incorporated herein by reference, discloses one exemplary approach.

Figure 3:
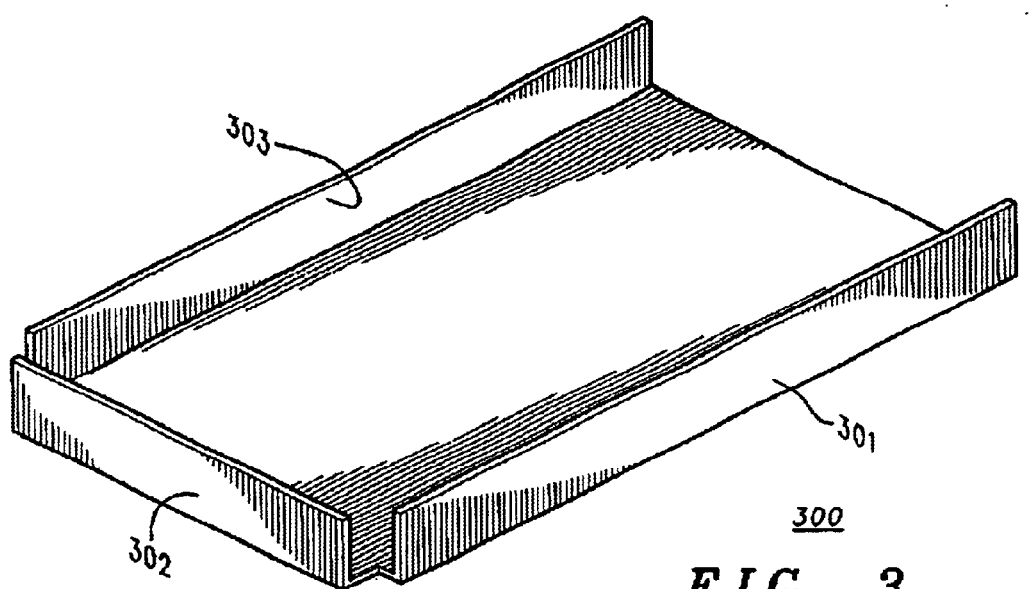
FIG. 3 is a thin-film bottom member in accordance with the invention.

Referring now to FIG. 3, illustrated therein is the solid member 300 that will form the bottom of the housing. In a preferred embodiment, the member 300 is a piece of plastic film. This film is preferably manufactured by extrusion. The extruding process allows the film to be far thinner than a similar piece of plastic manufactured by way of injection molding. The solid member 300 may include folded sides 301–303 that facilitate bonding to the injection molded walls.

Figure 4:
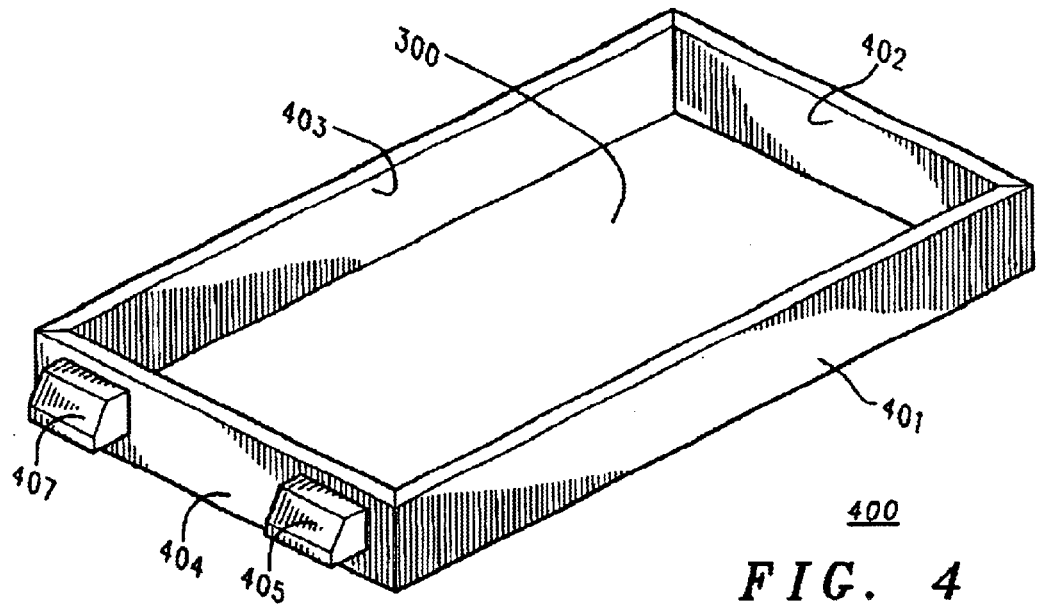
FIG. 4 is a battery housing in accordance with the invention.

Referring now to FIG. 4, illustrated therein is a hybrid battery housing 400 in accordance with the invention. In this particular embodiment, the bottom member 300 is a thin film, preferably extruded plastic. The sidewalls 401,403 and end walls 402,404 have been molded about the bottom member 300 by way of an insert molding process. End wall 404 may include at least one latch 405,407, although end wall 402 may include latches as well. Plastic is generally used to form the end walls, although other materials capable of being molded in the insert molding process would also suffice. Preferred types of plastic include acrylonitrile butadiene styrene (ADS), polycarbonate and polycarbonate-ABS due to their durability. Other equivalents known in the art, like styrene, poly-styrene or other thermo-plastics, for example, may be substituted.

Insert molding is the preferred method because the designer is able to inexpensively tool custom latches about a pair of thin and sturdy metal sidewalls. Additionally, the plastic walls prevent electrical shorting about the cell.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while battery housings for single, lithium-ion cell applications have been illustrated, it will be clear to those of ordinary skill in the art that housings for batteries having alternative form factors could also be manufactured using this process. Further, while polycarbonate film is preferred, other films and thermoplastics may be substituted, including ABS, polycarbonate, styrene and polycarbonate-ABS.

What is claimed is:

1. A battery housing, comprising:

a. at least one solid member, the solid member comprising a plastic film having a thickness less than 0.2 mm; and b. four molded members manufactured from plastic;

wherein the at least one molded member and the at least one solid member are mechanically coupled by way of an insert molding process;

wherein the at least one solid member is manufactured from plastic selected from the group consisting of ABS, polycarbonate, poly-styrene and polycarbonate-ABS.

2. The housing of claim 1, wherein the at least one solid member is manufactured by way of extrusion.

3. The housing of claim 2, comprising one solid member.

4. The housing of claim 3, wherein the four molded members are perpendicular to the solid member.

5. A rechargeable battery, comprising:

a. at least one rechargeable cell; and b. the battery housing of claim 1.

6. The battery of claim 5, wherein the at least one rechargeable cell is selected from the group consisting of nickel-cadmium cells, nickel-metal-hydride cells, lithium-ion cells and lithium polymer cells.

* * * * *